(12) United States Patent
Gopalasetty et al.

(10) Patent No.: US 10,708,225 B2
(45) Date of Patent: Jul. 7, 2020

(54) RESOLVING UPLINK INTERFACE OVERLAP FOR A NETWORK SWITCHING DEVICE

(71) Applicant: Hewlett Packard Enterprise Development LP, Houston, TX (US)

(72) Inventors: Bhanu Gopalasetty, Santa Clara, CA (US); Vamsi Kodavanty, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

(21) Appl. No.: 16/051,292

(22) Filed: Jul. 31, 2018

(65) Prior Publication Data

US 2020/0045012 A1    Feb. 6, 2020

(51) Int. Cl.
*G06F 15/16*    (2006.01)
*H04L 29/12*    (2006.01)

(52) U.S. Cl.
CPC ...... *H04L 61/2046* (2013.01); *H04L 61/2007* (2013.01); *H04L 61/2503* (2013.01)

(58) Field of Classification Search
CPC ............. H04L 61/2046; H04L 61/2503; H04L 61/2007
See application file for complete search history.

(56) References Cited

U.S. PATENT DOCUMENTS

| 7,085,836 | B1 | 8/2006 | Turner |
| 7,814,541 | B1 * | 10/2010 | Manvi ................ H04L 12/4645 713/154 |
| 8,050,267 | B2 | 11/2011 | Townsley et al. |
| 8,259,571 | B1 * | 9/2012 | Raphel ................ H04L 61/2535 370/230 |
| 8,804,745 | B1 * | 8/2014 | Sinn ........................ H04L 45/42 370/395.53 |
| 8,904,041 | B1 | 12/2014 | Poutievski et al. |
| 2004/0224637 | A1 * | 11/2004 | Silva ........................ H04B 7/04 455/63.4 |

(Continued)

OTHER PUBLICATIONS

The "Inside & Outside" of NAT for Overlapping Networks, Astorino J., http://www.astorinonetworks.com/2011/08/16/the-inside-outside-of-nat-for-overlapping-networks/, pp. 1-15.

(Continued)

*Primary Examiner* — Richard G Keehn
(74) *Attorney, Agent, or Firm* — Hewlett Packard Enterprise Patent Department

(57) ABSTRACT

Described herein are techniques for resolving overlapping IP addresses for subnets assigned to uplink interfaces of a network switching device. As an example, a network switching device may determine that an IP address range of a first assigned subnet to a first uplink interface overlaps an IP address range of a second assigned subnet to a second uplink interface. The network switching device may generate a first map between the first assigned subnet and a first intermediate subnet, and generate a second map between the second assigned subnet and a second intermediate subnet, wherein an IP address range of the first intermediate subnet and an IP address range of the second intermediate subnet are non-overlapping.

19 Claims, 9 Drawing Sheets

(56) References Cited

U.S. PATENT DOCUMENTS

| | | | | |
|---|---|---|---|---|
| 2008/0137625 | A1* | 6/2008 | Hori | H04L 45/00 370/338 |
| 2010/0202354 | A1* | 8/2010 | Ho | G06Q 10/06 370/328 |
| 2012/0082161 | A1* | 4/2012 | Leung | H04L 12/4633 370/392 |
| 2013/0182712 | A1* | 7/2013 | Aguayo | H04L 12/4633 370/395.53 |
| 2013/0198412 | A1* | 8/2013 | Saito | H04L 29/12009 709/245 |
| 2013/0275588 | A1* | 10/2013 | Li | H04L 61/2046 709/224 |
| 2013/0282923 | A1* | 10/2013 | Taylor | H04L 61/2535 709/245 |
| 2014/0153489 | A1* | 6/2014 | Perras | H04W 60/00 370/328 |
| 2015/0257081 | A1* | 9/2015 | Ramanujan | H04L 45/125 370/329 |
| 2016/0241471 | A1* | 8/2016 | Wan | H04L 45/74 |
| 2017/0126497 | A1* | 5/2017 | Dubey | G06F 9/45558 |
| 2017/0208528 | A1* | 7/2017 | Zhang | H04W 40/02 |
| 2017/0289856 | A1* | 10/2017 | Rune | H04W 36/0016 |
| 2018/0249506 | A1* | 8/2018 | Amiri | H04W 74/0816 |

OTHER PUBLICATIONS

VPNS with Overlapping Subnets Problem Scenario, https://www.juniper.net/documentation/en_US/release-independent/nce/topics/concept/lan2lan-vpn-jseries-srx-series-overview.html, pp. 1-5.

* cited by examiner

US 10,708,225 B2

RESOLVING UPLINK INTERFACE OVERLAP FOR A NETWORK SWITCHING DEVICE

BACKGROUND

A network switching device can forward packets of data between computer networks, computing devices, or a combination thereof. Furthermore, a network switching device can forward packets using the Internet Protocol (IP). When using the IP, each packet is encapsulated with a header comprising source and destination addresses for that packet. Each packet can be forwarded within a computer network or between computer networks based on its source and destination IP addresses.

A network switching device may be communicatively coupled to a computer network via one or more uplink interfaces. It may be advantageous for a network switching device to be communicatively coupled to a computer network via multiple uplink interfaces, for example, to improve availability, increase bandwidth, enable load balancing across the uplink interfaces, or a combination thereof. For instance, when multiple uplink interfaces of a network switching device are each communicatively coupled to a computer network via a different internet service provider (ISP) uplink, availability is improved, since the network switching device can continue to forward packets to the computer network even when one of the ISP uplinks experiences an internet service outage.

BRIEF DESCRIPTION OF THE DRAWINGS

The following detailed description references the drawings, wherein.

DETAILED DESCRIPTION

Figure 1:
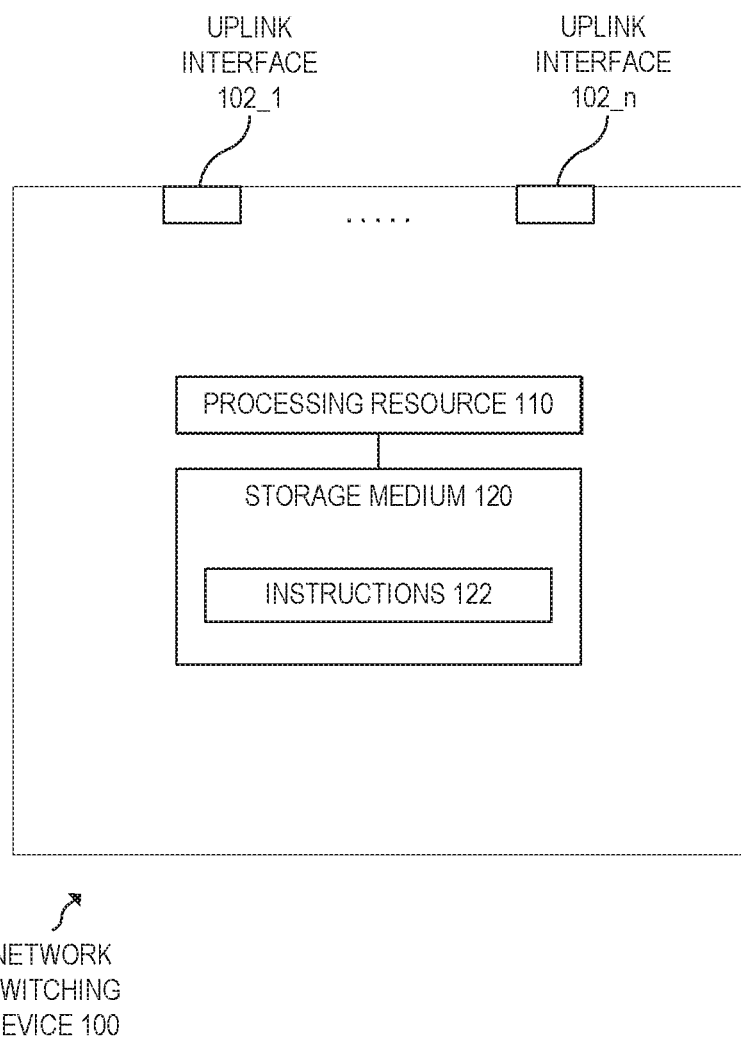
FIG. 1 is a block diagram of an example network switching device.

As noted above, a network switching device may be communicatively coupled to a computer network via multiple uplink interfaces. Moreover, each of these uplinks may be assigned a subnet, which is a logical partition of a computer network comprising one or more IP addresses. However, when these uplink interfaces are assigned subnets having overlapping IP address ranges, the network switching device may fail to successfully forward a packet via one or more of the uplink interfaces. This is because the IP cannot inherently route packets through the uplink interfaces when their respective subnets have overlapping IP address ranges. Two or more subnets have overlapping IP address ranges when they have at least one IP address in common with each other.

This problem may arise, for example, when each of the uplink interfaces of a network switching device is communicatively coupled to an uplink to a different ISP modem. Although an ISP modem receives a unique, public IP address from an ISP, the ISP modem will then typically assign a subnet from a private IP address space to an interface communicatively coupled to the ISP modem. Moreover, since private IP addresses are not typically assigned to be unique between different ISP modems, and since the private IP address space typically has a limited range (e.g., "192.168.0.0-192.168.255.255," "172.16.0.0-172.31.255.255," or "10.0.0.0-10.255.255.255"), a situation can arise where the ISP modems assign subnets to the uplink interfaces having overlapping IP address ranges.

When a network switching device uses Internet Protocol version 4 (IPv4), each uplink interface is assigned a subnet comprised of one or more 32-bit IP addresses. Each 32-bit IP address comprises a network address and a host address, which can be expressed in a dot-decimal notation consisting of four octets of the address expressed individually in decimal numbers and separated by periods. For example, for the subnet "192.168.0.0/16," the first 16 bits of each IP address are the network address (as indicated by the "/16" subnet mask), and the last 16 bits of each IP address are the host address. In such an example, the subnet has the IP address range of "192.168.x.y," where x and y each represent integers in the range of 0 to 255. In another example, for the subnet "192.168.0.0/24," the first 24 bits of each IP address are the network address, and the last 8 bits of each IP address are the host address. In such an example, the subnet has the IP address range of "192.168.0.x," where x represents integers in the range of 0 to 255. However, it is noted that a network switching device is not limited to using IPv4. For example, a network switching device may use Internet Protocol version 6 (IPv6) or another suitable communication protocol.

One existing solution to the overlapping subnets issue is to enable virtual routing and forwarding (VRF) on a network switching device. VRF creates multiple instances of a routing table which coexist at the same time within a network switching device. Since each uplink interface is assigned a separate instance of the routing table, and since these routing instances are independent of each other, the uplink interfaces can be assigned subnets having overlapping IP address ranges. However, VRF requires configuration and management of multiple routing instances and changes to certain routing protocols (e.g. Internet Protocol Security, Internet Key Exchange) to handle subnets having overlapping IP address ranges. Moreover, VRF is a "high-touch" functionality on a network switching device because it cannot be easily automated and often requires implementation by a user with a deep understanding of routing deployment. Furthermore, some network switching devices may not be VRF enabled.

To address these issues, examples described herein may determine that an IP address range of a first assigned subnet to a first uplink interface overlaps the IP address range of a second assigned subnet to a second uplink interface, generate a first map between the first assigned subnet and a first intermediate subnet, and generate a second map between the second assigned subnet and a second intermediate subnet, wherein an IP address range of the first intermediate subnet and an IP address range of the second intermediate subnet are non-overlapping.

In this manner, examples described herein may resolve overlapping IP address ranges for subnets assigned to the uplink interfaces of a network switching device without requiring VRF functionality to be implemented. For example, if an IP address range of the first intermediate subnet and an IP address range of the second intermediate subnet are non-overlapping, the need to configure and manage multiple instances of a routing table to resolve the overlapping IP address ranges is avoided. Moreover, the examples described herein can automatically detect and resolve the overlapping IP address ranges without requiring configuration and management of multiple instances of a routing table by a user. Therefore, the examples described herein provide simpler configuration, management, and implementation than VRF. Furthermore, the examples described herein can resolve overlapping IP address ranges on a network switching device when VRF functionality is not enabled on the network switching device.

Referring now to the drawings, FIG. 1 is a block diagram of an example network switching device. In the example of FIG. 1, network switching device 100 includes uplink interfaces 102_1 to 102_n, wherein n represents the total number of uplink interfaces and is an integer greater than or equal to 2. Moreover, network switching device 100 includes at least one processing resource 110, and at least one machine-readable storage medium 120 comprising (e.g., encoded with) at least instructions 122 executable by the at least one processing resource 110 of network switching device 100 to implement functionalities described herein in relation to instructions 122. In examples described herein, functionalities described as being performed by "instructions" may be understood as functionalities that may be performed by those instructions when executed by a processing resource.

In such examples, although network switching device 100 is referred to as a "switching" device, it may engage in any network data transmission operations, including, but not limited to, switching, routing, and bridging. In such examples, network switching device may be, for example, a controller, a branch gateway, a router, or a combination thereof.

The at least one processing resource 110 may include at least one central processing unit (CPU), other hardware devices or processing elements suitable to retrieve and execute instructions stored in memory, or a combination thereof. The at least one processing resource 110 can include single or multiple cores on a chip, multiple cores across multiple chips, multiple cores across multiple devices, or a combination thereof. The at least one processing resource 110 may fetch, decode, and execute instructions from memory to perform various functions. As an alternative or in addition to retrieving and executing instructions, the at least one processing resource 110 may include at least one integrated circuit (IC), other control logic, other electronic circuits, or a combination thereof that include a number of electronic components for performing various tasks or functions.

The at least one machine-readable storage medium 120 may be any electronic, magnetic, optical, or other physical storage device that contains or stores executable instructions. Thus, the at least one machine-readable storage medium 120 may comprise, for example, various Random Access Memory (RAM), Read Only Memory (ROM), flash memory, or any combination thereof. For example, the at least one machine-readable storage medium 120 may include a Non-Volatile Random Access Memory (NVRAM), an Electrically Erasable Programmable Read-Only Memory (EEPROM), a storage drive, a NAND flash memory, and the like.

In such examples, instructions 122 may determine that an IP address range of a first assigned subnet to a first uplink interface overlaps an IP address range of a second assigned subnet to a second uplink interface. Instructions 122 may generate a first map between the first assigned subnet and a first intermediate subnet, and generate a second map between the second assigned subnet and a second intermediate subnet, wherein an IP address range of the first intermediate subnet and an IP address range of the second intermediate subnet are non-overlapping.

For example, instructions 122 may determine that an IP address range of a first assigned subnet (e.g., "192.168.0.0/24") to first uplink interface 102_1 overlaps an IP address of a second assigned subnet (e.g., "192.168.0.0/24") to second uplink interface 102_2. Instructions 122 may generate a first map between the first assigned subnet and a first intermediate subnet (e.g., "10.1.1.0/24"), and generate a second map between the second assigned subnet and a second intermediate subnet (e.g., "10.2.2.0/24"), wherein an IP address range of the first intermediate subnet and an IP address range of the second intermediate subnet are non-overlapping.

Figure 2:
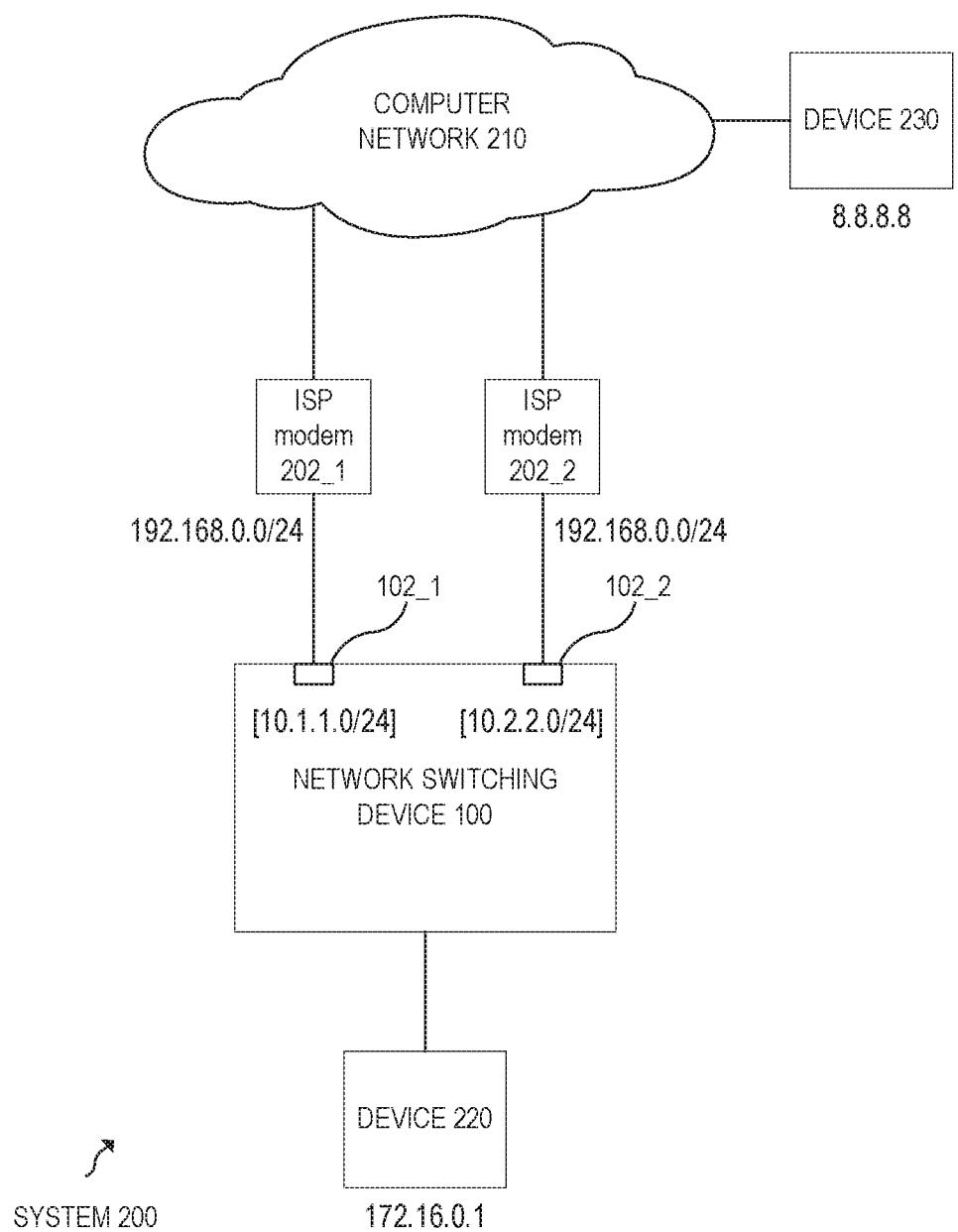
FIG. 2 is a block diagram of an example system including an example network switching device.

FIG. 2 is a block diagram of an example system 200 including network switching device 100. In the example of FIG. 2, network switching device 100 is communicatively coupled to ISP modem 202_1 via first uplink interface 102_1 and is communicatively coupled to ISP modem 202_2 via second uplink interface 102_2. Furthermore, ISP modem 202_1 and ISP modem 202_2 are communicatively coupled to computer network 210, device 220 is communicatively coupled to network switching device 100, and device 230 is communicatively coupled to computer network 210.

In such examples, computer network 210 may comprise, for example, a wide area network (WAN), local area network (LAN), campus area network (CAN), metropolitan area network (MAN), virtual private network (VPN), or any combination thereof. In such examples, a WAN may comprise, for example, a wired WAN, wireless WAN, hybrid WAN, software-defined WAN (SD-WAN), or the like, or any combination thereof. Furthermore, in such examples, one skilled in the art may recognize that computer network 210 may be any appropriate type of computer network.

In such examples, device 220 and device 230 may each be a computing device, such as, for example, a client or host device, server device, switch, router, repeater, hub, bridge, modem, firewall, or a combination thereof. Furthermore, device 220 and device 230 may each be assigned one or more IP addresses, subnets, or a combination thereof. For example, device 220 may be assigned an IP address (e.g., "172.16.0.1"), and device 230 may be assigned an IP address (e.g., "8.8.8.8").

In such examples, ISP modems 202_1 and 202_2 assign subnets to first and second uplink interfaces 102_1 and 102_2 from the private IP address space. For example, ISP modem 202_1 assigns a first assigned subnet (e.g., "192.168.0.0/24") to first uplink interface 102_1, and ISP modem 202_2 assigns a second assigned subnet (e.g., "192.168.0.0/24") to second uplink interface 102_2. The first and second assigned subnets may be assigned via a dynamic host configuration protocol (DHCP), static IP address assignment, or the like.

Figure 3:
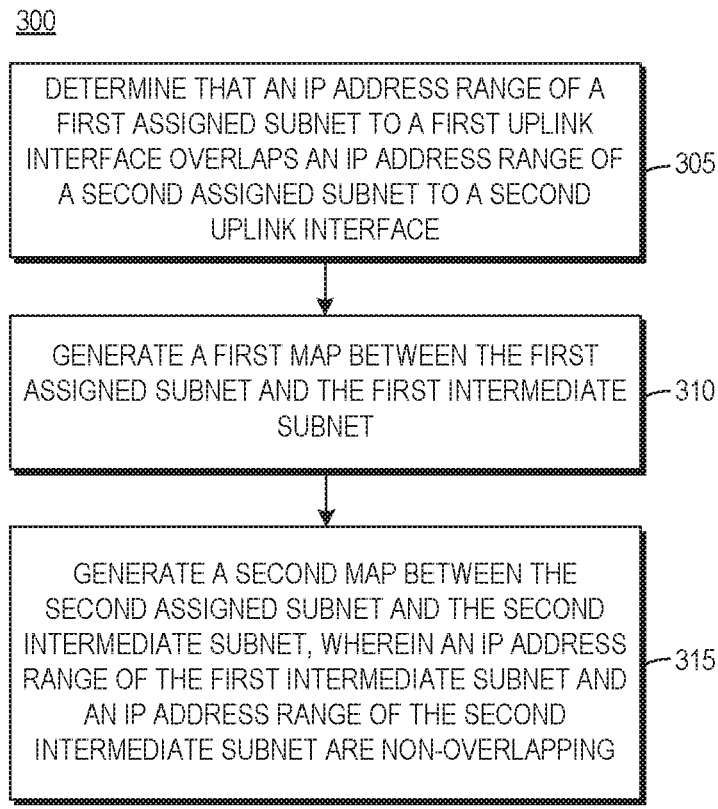
FIG. 3 is a flowchart of an example method to resolve overlapping IP address ranges for a first assigned subnet of a first uplink interface and a second assigned subnet of a second uplink interface of an example network switching device.

FIG. 3 is a flowchart of an example method 300 for resolving overlapping IP addresses. Referring to FIG. 3, block 305 may determine that an IP address range of a first assigned subnet to first uplink interface 102_1 overlaps an IP address range of a second assigned subnet to second uplink interface 102_2. Block 310 may generate a first map between the first assigned subnet and a first intermediate subnet. Block 315 may generate a second map between the second assigned subnet and a second intermediate subnet, wherein an IP address range of the first intermediate subnet and an IP address range of the second intermediate subnet are non-overlapping.

In such examples, block 310 may further comprise mapping an IP address and a gateway of the first assigned subnet to an IP address and a gateway of the first intermediate subnet, and block 315 may further comprise mapping an IP address and a gateway of the second assigned subnet to an IP address and a gateway of the second intermediate subnet. In such examples, a gateway is an IP address that is used as the destination for a packet being forwarded outside of a subnet as its next destination.

For example, block 310 may further comprise instructions 122 for mapping an IP address (e.g., "192.168.0.1") and gateway (e.g., "192.168.0.254") of the first assigned subnet (e.g., "192.168.0.0/24") to an IP address (e.g., "10.1.1.1") and gateway (e.g., "10.1.1.254") of the first intermediate subnet (e.g., "10.1.1.0/24"). Block 315 may further comprise instructions 122 for mapping an IP address (e.g., "192.168.0.1") and gateway (e.g., "192.168.0.254") of the second assigned subnet (e.g., "192.168.0.0/24") to an IP address (e.g., "10.2.2.2") and gateway (e.g., "10.2.2.254") of the second intermediate subnet (e.g., "10.22.0/24").

Figure 4:
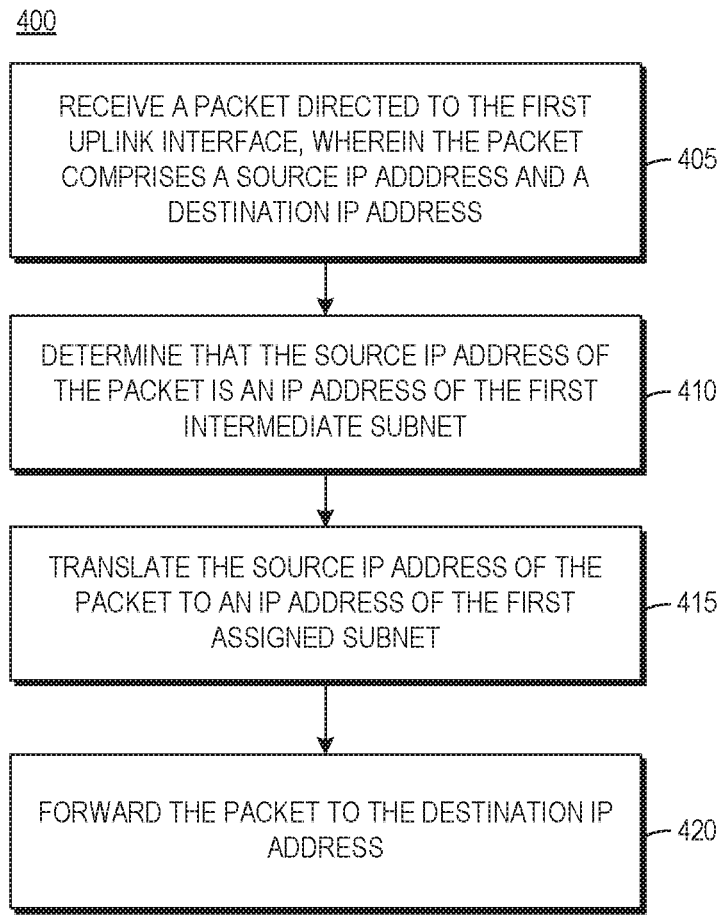
FIG. 4 is a flowchart of an example method to forward a packet in an egress direction via a first uplink interface of an example network switching device.

FIG. 4 is a flowchart of an example method 400 to forward a packet in an egress direction via first uplink interface 102_1. A packet is forwarded in an egress direction via first uplink interface 102_1 when it is forwarded in a direction from network switching device 100 to computer network 210. It is noted that the functionalities described herein in relation to FIG. 4 are provided in combination with functionalities provided in FIG. 3, and may further be provided in combination with functionalities provided in FIGS. 1, 2, and 5-9. Referring to FIG. 4, block 405 may receive a request to direct a packet to first uplink interface 102_1, wherein the packet comprises a source IP address and a destination IP address. Block 410 may determine that the source IP address of the packet is an IP address of the first intermediate subnet. Block 415 may translate the source IP address of the packet to an IP address of the first assigned subnet. Block 420 may forward the packet to the destination IP address.

For example, at block 405, instructions 122 may receive a request to direct a packet to first uplink interface 102_1, wherein the packet comprises a source IP address (e.g., "10.1.1.1") corresponding to an IP address of the first intermediate subnet (e.g., "10.1.1.0/24") and a destination IP address (e.g., "8.8.8.8") corresponding to an IP address of device 230. At block 410, instructions 122 may determine that the source IP address of the packet is an IP address of the first intermediate subnet. At block 415, instructions 122 may translate the source IP address of the packet to an IP address (e.g., "192.168.0.1") of the first assigned subnet (e.g. "192.168.0.0/24"). At block 420, instruction 122 may forward the packet to the destination IP address.

Figure 5:
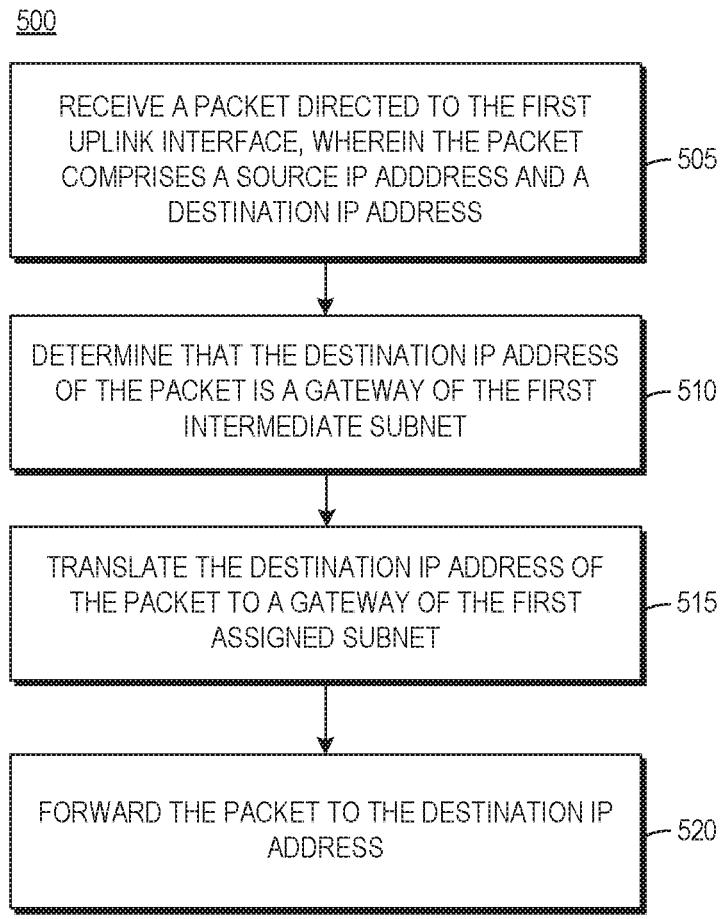
FIG. 5 is a flowchart of an example method to forward a packet in an egress direction via a first uplink interface of an example network switching device.

FIG. 5 is a flowchart of an example method 500 to forward a packet in an egress direction via first uplink interface 102_1. It is noted that the functionalities described herein in relation to FIG. 5 are provided in combination with functionalities provided in FIG. 3, and may further be provided in combination with functionalities provided in FIGS. 1, 2, 4, and 6-9. Referring to FIG. 5, block 505 may receive a request to direct a packet to first uplink interface 102_1, wherein the packet comprises a source IP address and a destination IP address. Block 510 may determine that the destination IP address of the packet is a gateway of the first intermediate subnet. Block 515 may translate the destination IP address of the packet to a gateway of the first assigned subnet. Block 520 may forward the packet to the destination IP address.

For example, at block 505, instructions 122 may receive a request to direct a packet to first uplink interface 102_1, wherein the packet comprises a source IP address (e.g., "172.16.0.1") corresponding to an IP address of device 220 and a destination IP address (e.g., "10.1.1.254") corresponding to a gateway of the first intermediate subnet (e.g., "10.1.1.0/24"). At block 510, instructions 122 may determine that the destination IP address of the packet is a gateway of the first intermediate subnet. At block 515, instructions 122 may translate the destination IP address of the packet to a gateway (e.g., "192.168.0.254") of the first assigned subnet (e.g. "192.168.0.0/24"). At block 520, instruction 122 may forward the packet to the destination IP address.

Figure 6:
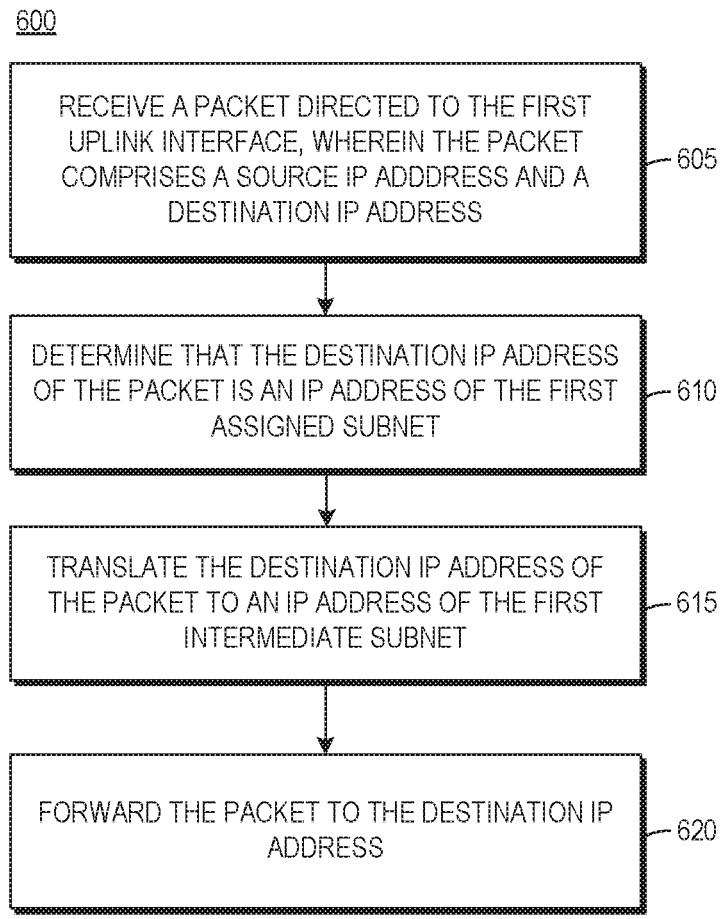
FIG. 6 is a flowchart of an example method to forward a packet in an ingress direction via a first uplink interface of an example network switching device.

FIG. 6 is a flowchart of an example method 600 to forward a packet in an ingress direction via first uplink interface 102_1. A packet is forwarded in an ingress direction via first uplink interface 102_1 when it is forwarded in a direction from computer network 210 to network switching device 100. It is noted that the functionalities described herein in relation to FIG. 6 are provided in combination with functionalities provided in FIG. 3, and may further be provided in combination with functionalities provided in FIGS. 1, 2, and 4-9. Referring to FIG. 6, block 605 may receive a request to direct a packet to first uplink interface 102_1, wherein the packet comprises a source IP address and a destination IP address. Block 610 may determine that the destination IP address of the packet is an IP address of the first assigned subnet. Block 615 may translate the destination IP address of the packet to an IP address of the first intermediate subnet. Block 620 may forward the packet to the destination IP address.

For example, at block 605, instructions 122 may receive a request to direct a packet to first uplink interface 102_1, wherein the packet comprises a source IP address (e.g., "8.8.8.8") corresponding to an IP address of device 230 and a destination IP address (e.g., "192.168.0.1") corresponding to an IP address of the first assigned subnet "192.168.0.0/24"). At block 610, instructions 122 may determine that the destination IP address of the packet is an IP address of the first assigned subnet. At block 615, instructions 122 may translate the destination IP address of the packet to an IP address (e.g., "10.1.1.1") of the first intermediate subnet (e.g., "10.1.1.0/24"). At block 620, instructions 122 may forward the packet to the destination IP address.

Figure 7:
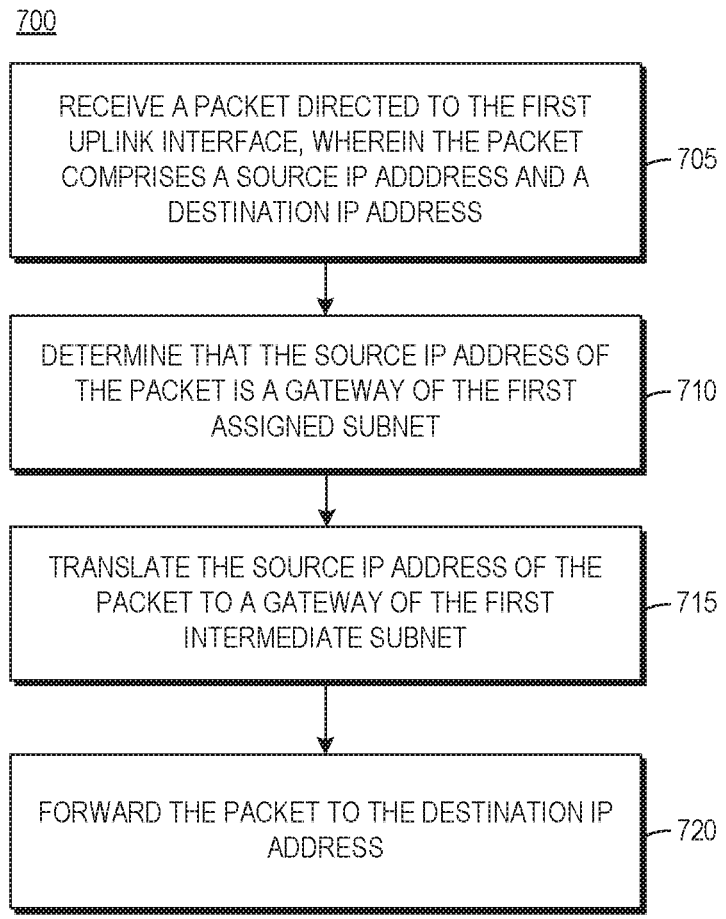
FIG. 7 is a flowchart of an example method to forward a packet in an ingress direction via a first uplink interface of an example network switching device.

FIG. 7 is a flowchart of an example method 700 to forward a packet in an ingress direction via first uplink interface 102_1. It is noted that the functionalities described herein in relation to FIG. 7 are provided in combination with functionalities provided in FIG. 3, and may further be provided in combination with functionalities provided in FIGS. 1, 2, and 4-9. Block 705 may receive a request to direct a packet to first uplink interface 102_1, wherein the packet comprises a source IP address and a destination IP address. Block 710 may determine that the source IP address of the packet is a gateway of the first assigned subnet. Block 715 may translate the source IP address of the packet to a gateway of the first intermediate subnet. Block 720 may forward the packet to the destination IP address.

For example, at block 705, instructions 122 may receive a request to direct a packet to first uplink interface 102_1, wherein the packet comprises a source IP address (e.g., "192.168.0.254") corresponding to a gateway of the first assigned subnet (e.g., "192.168.0.0/24") and a destination IP address (e.g., "172.16.0.1") corresponding to an IP address of device 220. At block 710, instructions 122 may determine that the source IP address of the packet is a gateway of the first assigned subnet. At block 715, instructions 122 may translate the source IP address of the packet to a gateway (e.g., "10.1.1.254") of the first intermediate subnet (e.g., "10.1.1.0/24"). At block 720, instructions 122 may forward the packet to the destination IP address.

In some examples, an addressing resolution protocol (ARP) table may store an entry for an IP address of the first assigned subnet with a unique identifier of the first uplink interface, and may store an entry for an IP address of the second assigned subnet with a unique identifier of the second uplink interface. For example, an ARP table may store entry for a gateway (e.g., "198.162.0.254") of the first assigned subnet ("198.162.0.0/24") with a media access control (MAC) address of the gateway of the first uplink interface, and may store an entry for a gateway (e.g. "198.162.0.254") of the second assigned subnet ("198.162.0.0/24") with a MAC address of the gateway of the second uplink interface. The ARP table may be stored in a repository.

In some examples, a gateway route-cache may store an entry for a gateway of the first intermediate subnet with a unique identifier of the first uplink interface, and may store an entry for a gateway of the second intermediate subnet with a unique identifier of the second uplink interface. For example, a gateway-route cache may store an entry for a gateway (e.g., "10.1.1.254") for the first intermediate subnet (e.g "10.1.1.0/24") with a MAC address of the gateway of the first uplink interface, and may store a gateway (e.g., "10.2.2.254") for the second intermediate subnet (e.g., "10.2.2.0/24") with a MAC address of the gateway of the second uplink interface. The gateway route-cache may be stored in a repository.

Figure 8:
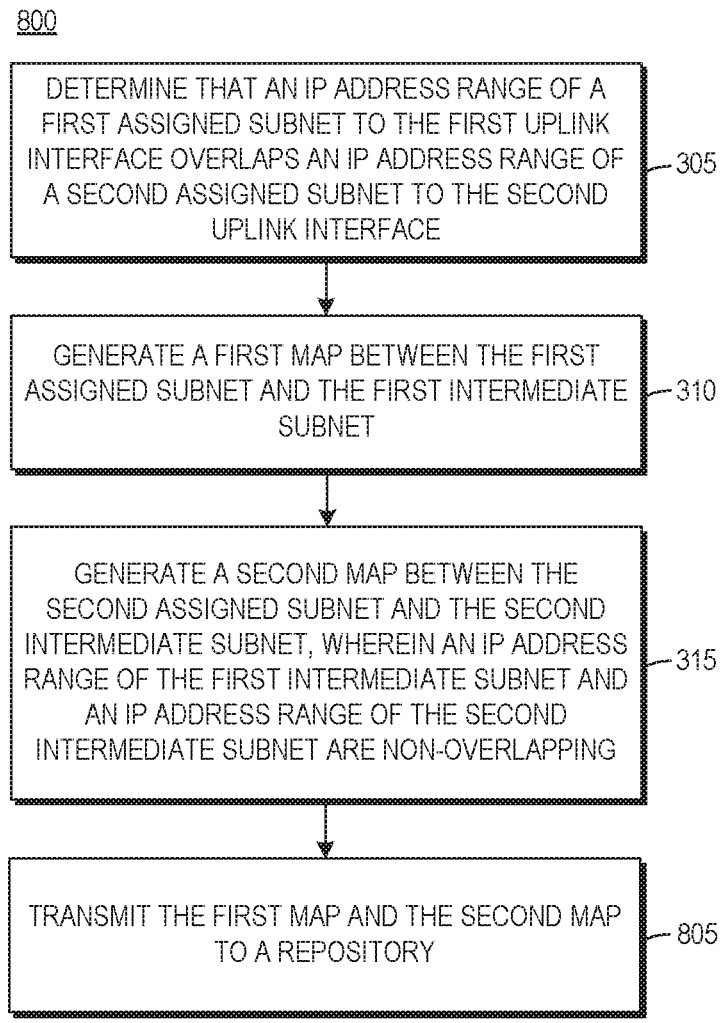
FIG. 8 is a flowchart of an example method to transmit a first map and a second map to a repository of an example network switching device.

FIG. 8 is a flowchart of an example method 800 for resolving overlapping IP addresses for first and second uplink interfaces of a network switching device. Referring to FIG. 8, it is noted that 305, 310, and 315 are the same blocks as those for method 300, and are included to provide context for block 805 of method 800. Furthermore, it is noted that the functionalities described herein in relation to FIG. 8 may be provided in combination with functionalities provided in any of FIGS. 1, 2, 4-7 and 9.

Regarding FIG. 8, block 805 may transmit the first map and a second map to a repository. For example, at block 805, instructions 122 may transmit the first map (e.g., "192.168.0.0/24" mapped to "10.1.1.0/24") and the second map ("192.168.0.0/24" mapped to "10.2.2.0/24") to a repository.

In some examples, a repository may include at least one machine-readable storage medium. The at least one machine-readable storage medium may be any electronic, magnetic, optical, or other physical storage device that contains or stores executable instructions. Thus, the at least one machine-readable storage medium may comprise, for example, various RAM, ROM, flash memory, or a combination thereof. For example, the at least one machine-readable storage medium may include a NVRAM, an EEPROM, a storage drive, a NAND flash memory, and the like.

Figure 9:
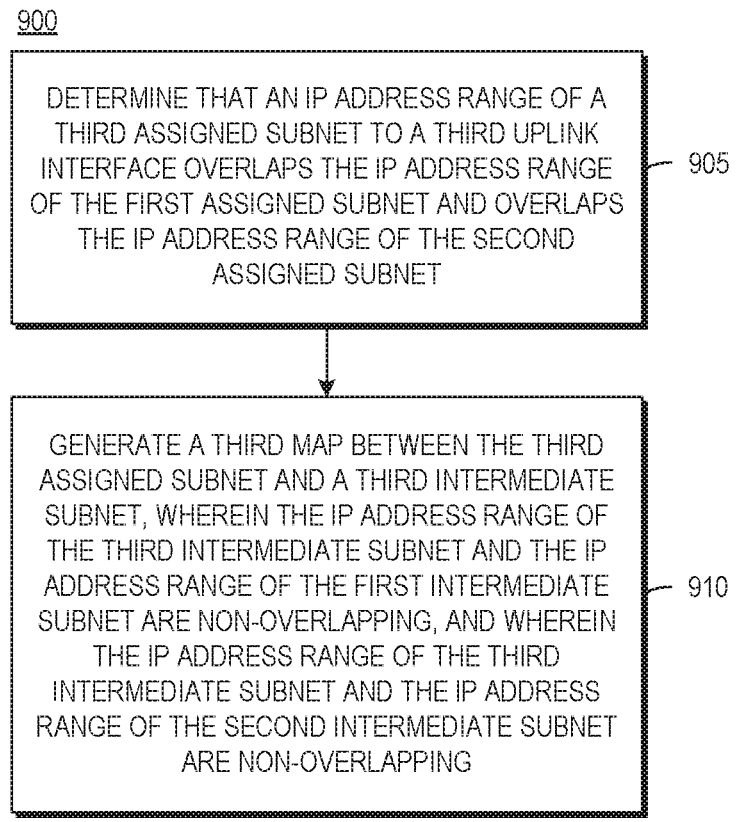
FIG. 9 is a flowchart of an example method to resolve overlapping IP addresses for a third assigned subnet to a third uplink interface of an example network switching device.

FIG. 9 is a flowchart of an example method 900 for resolving overlapping IP addresses for first, second, and third uplink interfaces of a network switching device. It is noted that the functionalities described herein in relation to FIG. 9 are provided in combination with functionalities provided in FIG. 3, and may further be provided in combination with functionalities provided in FIGS. 1, 2, and 4-8.

Regarding FIG. 9, block 905 may determine that an IP address range of a third assigned subnet to third uplink interface 102_3 overlaps the IP address range of the first assigned subnet to first uplink interface 102_1 and overlaps the IP address range of the second assigned subnet to second uplink interface 102_2. Block 910 may generate a third map between the third assigned subnet and a third intermediate subnet, wherein an IP address range of the third intermediate subnet and the IP address range of the first intermediate subnet are non-overlapping, and wherein the IP address range of the third intermediate subnet and the IP address range of the second intermediate subnet are non-overlapping.

For example, at block 905, instructions 122 may determine that an IP address range of a third assigned subnet "192.168.0.0/24") to third uplink interface 102_3 overlaps the IP address range of the first assigned subnet (e.g., "192.168.0.0/24") to first uplink interface 102_1 and overlaps the IP address range of the second assigned subnet (e.g., "192.168.0.0/24") to second uplink interface 102_2. At block 910, instructions 122 may generate a third map between the third assigned subnet and a third intermediate subnet (e.g., "10.3.3.0/24"), wherein an IP address range of the third intermediate subnet and the IP address range of the first intermediate subnet (e.g., "10.1.1.0/24") are non-overlapping, and wherein an IP address range of the third intermediate subnet and the IP address range of the second intermediate subnet (e.g. "10.2.2.0/24") are non-overlapping.

Although the present disclosure has been described in detail, it should be understood that various changes, substitutions and alterations can be made without departing from the spirit and scope of the disclosure. Any use of the words "may" and "can" in respect to features of the disclosure indicates that certain examples include the feature and certain other examples do not include the feature, as is appropriate given the context. Any use of the words "or" or "and" in respect to features of the disclosure indicates that examples can contain any combination of the listed features, as is appropriate given the context.

Phrases and parentheticals beginning with "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A network switching device, comprising:
    at least one processing resource and at least one non-transitory machine-readable storage medium comprising instructions executable by the at least one processing resource to:
        determine that an IP address range of a first assigned subnet to a first uplink interface overlaps an IP address range of a second assigned subnet to a second uplink interface;
        generate a first map between the first assigned subnet and a first intermediate subnet, the first map including a mapping of an IP address and gateway of the first assigned subnet to an IP address and gateway of the first intermediate subnet; and
        generate a second map between the second assigned subnet and a second intermediate subnet, the second map including a mapping of an IP address and gateway of the second assigned subnet to an IP address and gateway of the second intermediate subnet, wherein
        an IP address range of the first intermediate subnet and an IP address range of the second intermediate subnet are non-overlapping.

2. The network switching device of claim 1, wherein the instructions comprise instructions executable to:
    receive a request to direct a packet to the first uplink interface, wherein the packet comprises a source IP address and a destination IP address;
    determine that the source IP address of the packet is an IP address of the first intermediate subnet; and
    translate the source IP address of the packet to an IP address of the first assigned subnet before the packet is forwarded to the destination IP address.

3. The network switching device of claim 1, wherein the instructions comprise instructions executable to:
    receive a request to direct a packet to the first uplink interface, wherein the packet comprises a source IP address and a destination IP address;
    determine that the destination IP address of the packet is a gateway of the first intermediate subnet; and
    translate the destination IP address of the packet to a gateway of the first assigned subnet before the packet is forwarded to the destination IP address.

4. The network switching device of claim 1, wherein the instructions comprise instructions executable to:
    receive a request to direct a packet to the first uplink interface, wherein the packet comprises a source IP address and an IP address of the first assigned subnet as a destination IP address;
    determine that the destination IP address of the packet is an IP address of the first assigned subnet; and
    translate the destination IP address of the packet to an IP address of the first intermediate subnet before the packet is forwarded to the destination IP address.

5. The network switching device of claim 1, wherein the instructions comprise instructions executable to:
    receive a request to direct a packet to the first uplink interface, wherein the packet comprises a source IP address and a destination IP address;
    determine that the source IP address of the packet is a gateway of the first assigned subnet; and
    translate the source IP address of the packet to a gateway of the first intermediate subnet before the packet is forwarded to the destination IP address.

6. The network switching device of claim 1, wherein the network switching device is capable of being communicatively coupled to a wide area network via the first and second uplink interfaces.

7. The network switching device of claim 1, wherein the instructions comprise instructions executable to transmit the first map and the second map to a repository.

8. The network switching device of claim 1, wherein the instructions comprise instructions executable to:
    determine that an IP address range of a third assigned subnet to a third uplink interface overlaps the IP address range of the first assigned subnet and overlaps the IP range of the second assigned subnet; and
    generate a third map between the third assigned subnet and a third intermediate subnet;
    wherein an IP address range of the third intermediate subnet and the IP address range of the first intermediate subnet are non-overlapping, and wherein the IP address range of the third intermediate subnet and the IP address range of the second intermediate subnet are non-overlapping.

9. The network switching device of claim 1, wherein the instructions comprise instructions executable to store, in a repository, an entry for a gateway of the first intermediate subnet with a unique identifier of the first uplink interface, and an entry for a gateway of the second intermediate subnet with a unique identifier of the second uplink interface.

10. An article comprising at least one non-transitory machine-readable storage medium comprising instructions executable by at least one processing resource to:
    determine, for a network switching device comprising a first uplink interface and a second uplink interface, that an IP address range of a first assigned subnet to the first uplink interface overlaps an IP address range of a second assigned subnet to the second uplink interface;
    map a first intermediate subnet to the first assigned subnet, the first map including a mapping of an IP address and gateway of the first intermediate subnet to an IP address and gateway of the first assigned subnet; and
    map a second intermediate subnet to the second assigned subnet, the second map including a mapping of an IP address and gateway of the second intermediate subnet to an IP address and gateway of the second assigned subnet;
    wherein an IP address range of the first intermediate subnet and an IP address range of the second intermediate subnet are non-overlapping.

11. The article of claim 10, wherein the instructions comprise instructions executable to:
    receive a request to direct a packet to the first uplink interface, wherein the packet comprises a source IP address and a destination IP address;
    determine that the source IP address of the packet is an IP address of the first intermediate subnet;
    translate the source IP address of the packet to an IP address of the first assigned subnet; and
    forward the packet to the destination IP address.

12. The article of claim 10, wherein the instructions comprise instructions executable to:
    receive a request to direct a packet to the first uplink interface, wherein the packet comprises a source IP address and a destination IP address;
    determine that the destination IP address of the packet is a gateway of the first intermediate subnet; and
    translate the destination IP address of the packet to a gateway of the first assigned subnet; and
    forward the packet to the destination IP address.

13. The article of claim 10, wherein the instructions comprise instructions executable to:
  receive a request to direct a packet to the first uplink interface, wherein the packet comprises a source IP address and an IP address of the first assigned subnet as a destination IP address;
  determine that the destination IP address of the packet is an IP address of the first assigned subnet;
  translate the destination IP address of the packet to an IP address of the first intermediate subnet; and
  forward the packet to the destination IP address.

14. The network switching device of claim 10, wherein the instructions comprise instructions executable to:
  receive a request to direct a packet to the first uplink interface, wherein the packet comprises a source IP address and an IP address of the first assigned subnet as a destination IP address;
  determine that the source IP address of the packet is a gateway of the first assigned subnet;
  translate the source IP address of the packet to a gateway of the first intermediate subnet; and
  forward the packet to the destination IP address.

15. A method comprising:
  determining, for a network switching device comprising a first uplink interface and second uplink interface, that an IP address range of a first assigned subnet to the first uplink interface overlaps an IP address range of a second assigned subnet to the second uplink interface;
  mapping a first intermediate subnet to the first assigned subnet, the first mapping including a mapping of an IP address and gateway of the first intermediate subnet to an IP address and gateway of the first assigned subnet; and
  mapping a second intermediate subnet to the second assigned subnet, the second mapping including a mapping of an IP address and gateway of the second intermediate subnet to an IP address and gateway of the second assigned subnet;
  wherein an IP address range of the first intermediate subnet and an IP address range of the second intermediate subnet are non-overlapping.

16. The method of claim 15, further comprising:
  receiving a request to direct a packet to the first uplink interface, wherein the packet comprises a source IP address and a destination IP address;
  determining that the source IP address of the packet is an IP address of the first intermediate subnet; and
  translating the source IP address of the packet to an IP address of the first assigned subnet.

17. The method of claim 15, further comprising:
  receiving a request to direct a packet to the first uplink interface, wherein the packet comprises a source IP address and a destination IP address;
  determining that the destination IP address of the packet is a gateway of the first intermediate subnet; and
  translating the destination IP address of the packet to a gateway of the first assigned subnet.

18. The method of claim 15, further comprising:
  receiving a request to direct a packet to the first uplink interface, wherein the packet comprises a source IP address and a destination IP address;
  determining that the destination IP address of the packet is an IP address of the first assigned subnet; and
  translating the destination IP address of the packet to an IP address of the first intermediate subnet.

19. The method of claim 15, further comprising:
  receiving a request to direct a packet to the first uplink interface, wherein the packet comprises a source IP address and a destination IP address;
  determining that the source IP address of the packet is a gateway of the first assigned subnet;
  translating the source IP address of the packet to a gateway of the first intermediate subnet.

* * * * *